Sept. 7, 1954            J. J. STRNAD            2,688,211

EXPANSIBLE-TOOL DRIVING MACHINE

Filed Nov. 30, 1949                            3 Sheets-Sheet 1

INVENTOR.
James J. Strnad
BY Harry P. Canfield
ATTORNEY

Patented Sept. 7, 1954

2,688,211

UNITED STATES PATENT OFFICE 2,688,211

EXPANSIBLE-TOOL DRIVING MACHINE

James J. Strnad, Bedford, Ohio, assignor to Lempco Products, Inc., Bedford, Ohio, a corporation of Ohio Application November 30, 1949, Serial No. 130,223

20 Claims. (Cl. 51—72)

This invention relates to machines for rotatably driving expansible abrading tools, expansible reamers, and the like.

In various art and manufacturing processes, cylindrical holes, bearing bores, etc. must be finished to a high degree of accuracy as to diameter, and smoothness as to wall surface; and this has been done by first making the hole or bore undersize in diameter, and by inserting into the hole or bore a rotatable abrading tool called a hone, or a rotatable cutting tool called a reamer; and rotating the tool by a power driven machine; and expanding the working diameter of the tool, that is the diameter of its abrading or cutting or working parts, to work the wall of the hole or bore to the desired final diameter and finish.

In some prior practice, the expansible tools are provided with manual means for expanding them by small increments from time to time as the operation proceeds.

In the present invention the construction of the tool is coordinated with that of the machine so that the tool can be expanded and contracted by operation of the machine while being rotatably driven thereby.

It is accordingly an object of the invention to provide generally an improved machine for rotatably driving expansible tools and comprising improved means for expanding and contracting the tools.

The development of expansible hone tools has led to a hone construction comprising a spindle rotatable on a spindle axis; and a plurality of abrading stones disposed around the axis; and spring means to move the stones radially inwardly to contract the working diameter of the stones, and a mechanism operable to move the stones outwardly radially to expand the working diameter of the stones.

Representative of such hone tools is that illustrated and described in the copending application of Jack F. Smole, Serial Number 744,693, filed April 29, 1947, now Patent No. 2,596,961, dated May 13, 1952, assigned to the assignee of this present application.

The development of expansible reamers has led to a reamer construction, which, similarly to the hone, comprises a spindle rotatable on a spindle axis; but having a plurality of cutters disposed around the axis; and, oppositely to the hone construction, comprising a mechanism operable to move the cutters inwardly toward the axis to contract their working diameter, and spring means for moving them outwardly radially to expand their working diameter.

Representative of such reamer tools is that illustrated and described in the copending application of William J. Blazek, Serial Number 92,467, filed May 10, 1949, assigned to the assignee of this present application.

Such hone tools and reamer tools usually have an oil duct or ducts in the tool spindle for receiving oil at the end of the spindle and supplying it laterally to the working surfaces of the tool.

It is accordingly another object of this invention to provide a machine for mounting and driving optionally, either a hone tool or a reamer tool having the above opposite characteristics of mode of operation, and comprising improved means under control of a machine operator for effecting micrometer variations or adjustments of the working diameter of either of said types of tool, when optionally driven by the machine.

The machine of the present invention is designed for rotatably driving expansible tools generally of the class that have a tool spindle made to be mounted on the end of a rotary machine spindle in axial alignment therewith to be rotatably driven thereby; and that have a diameter changing mechanism actuated by an axially movable actuating element of the machine; the two types of tool above referred to among others being of that class; and the machine of the present invention comprises such an axially movable actuating element.

It is accordingly an object of the present invention to provide an expansible-tool driving machine, having such an axially movable actuating element, and improved means by which an operator of the machine can move the actuating element axially; and change its axial positions, and change the extent of its axial movement, etc. with a high degree of accuracy.

With further reference to said axially movable actuating element of the machine, another object is to provide operator operable means for accurately positioning the actuating element at a preselected position axially, and then moving it axially from that position with a preselected accurate extent of movement.

Another object is to provide an operator operable means as referred to in the preceding paragraph comprising means for moving the positioned actuating element axially by operator's foot power.

Another object is to provide improved manual means for positioning the actuating element axially and moving it axially, and comprising means for indicating its position.

Another object is to provide an axially movable actuator as aforesaid of improved sleeve form surrounding the machine tool driving spindle.

Another object is to provide an improved control of motor power for driving the machine spindle of a hone tool or reamer tool driving machine, by which the operator of the machine may start and stop the motor and machine spindle by movement of a pedal, thereby leaving both hands free to manipulate the work.

Another object is to provide, in connection with said pedal control, means by which, initial movement of the pedal will start the machine and subsequent continued movement of the pedal will effect movement of the said axially movable actuating element.

Another object is to provide, in connection with said pedal control, means for optionally confining its control to starting and stopping of the machine.

Another object is to provide in a motor driven machine of the class referred to an improved construction of power transmission between the motor and a power driven tool spindle and a power driven lubricant pump of the machine.

Another object is to provide a machine of the class referred to comprising a rotary tool driving spindle, and having an improved lubricant supplying and conducting system for supplying lubricant to the tool while the spindle is rotating.

Other objects will hereinafter become apparent to those skilled in the art to which the invention appertains.

The invention is fully disclosed in the following description taken in connection with the accompanying drawing, in which:

Fig. 8 is a sectional view from the plane 8—8 of Fig. 3 with parts behind the section plane omitted;

Figures 1, 6, 10:
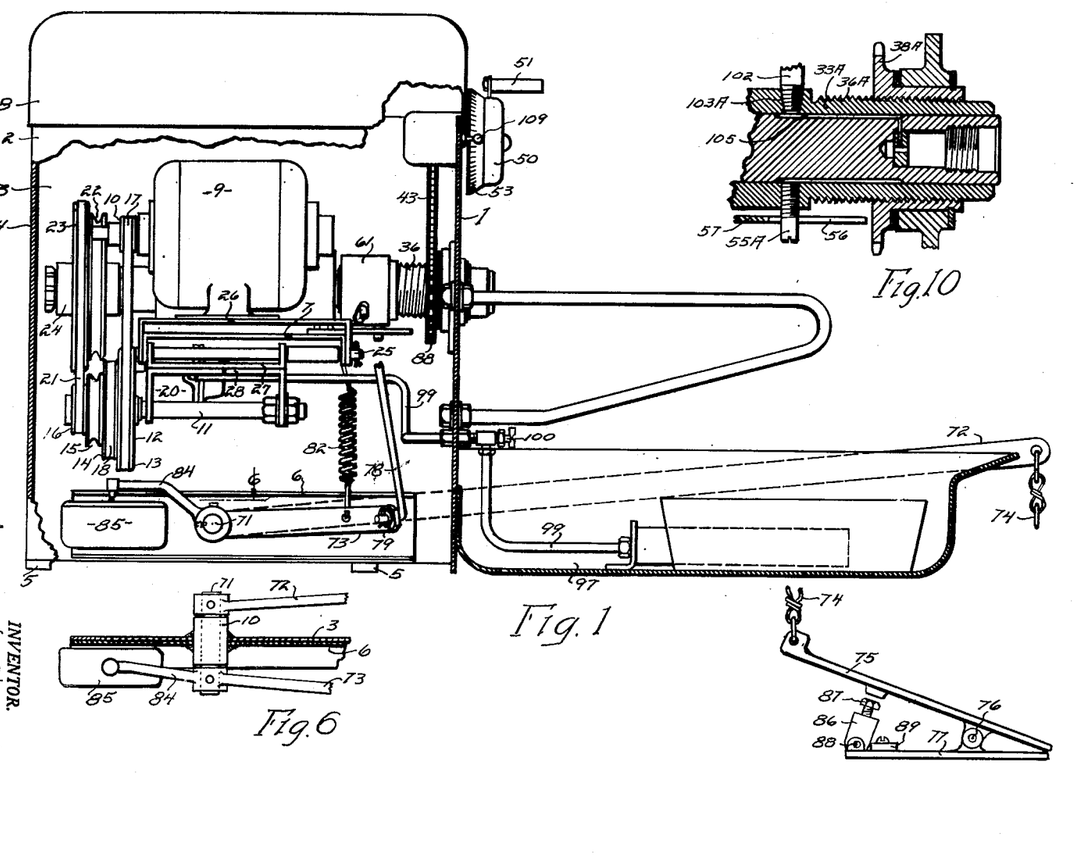
Figs. 1 and 2 are respectively side elevational and front elevational views of a machine embodying the invention with parts broken away and in section.
Fig. 6 is a fragmentary sectional view taken from the plane 6 of Fig 1.
Fig. 10 is a view similar to a part of Fig. 3 showing a modification.
Figures 2, 4, 5, 7:
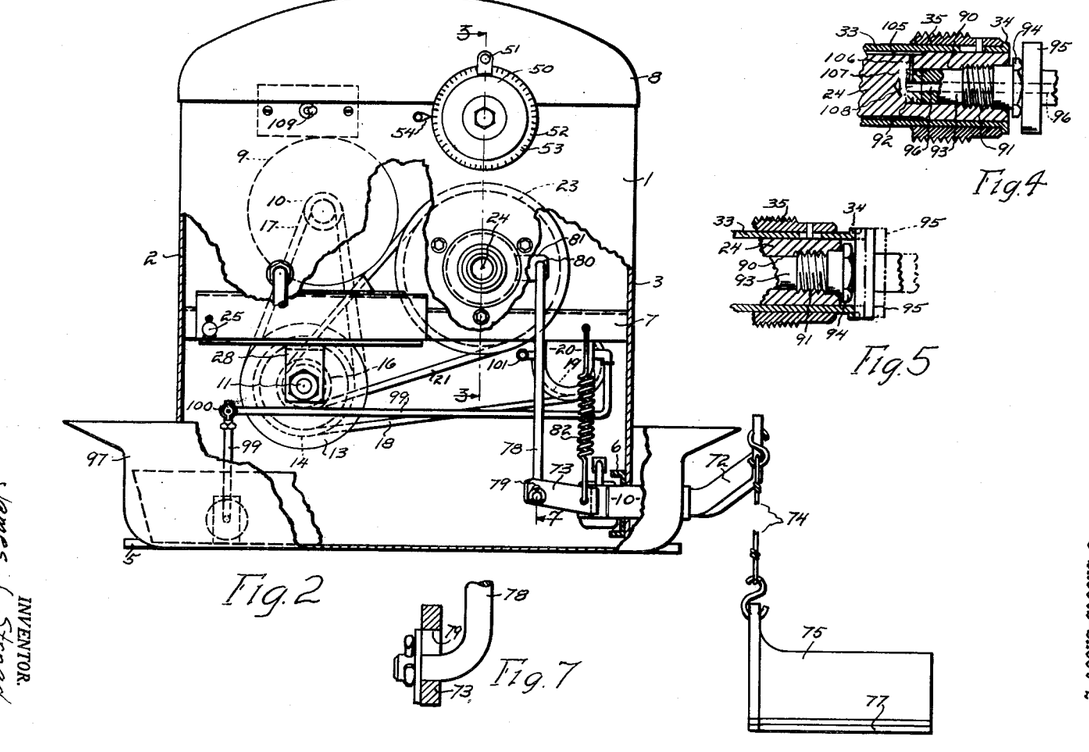
Figs. 4 and 5 are views illustrating a part of a machine spindle of Fig. 3 with a tool mounted thereon and with a tool operating element of the machine in two tool operative positions respectively.
Fig. 7 is a fragmentary view to enlarged scale taken from the plane 7 of Fig. 2.

Referring to the drawing, there is shown in Figs. 1 and 2, a main frame, comprising a front wall 1, side walls 2—3, a rear wall 4, transversely extending steel mounting feet 5—5, and, connected with the walls, a forwardly and rearwardly extending steel channel 6 and a transverse channel 7, some of these frame elements being illustrated fragmentarily in other figures.

Parts of the machine are mounted on these frame elements and substantially enclosed by the walls, and a top cover 8 may be provided.

It is intended that the machine will be supported on a bench or the like at a height from the floor convenient for its operation as will become apparent.

An electric motor 9 (supported as will be described) has a belt pulley 10 on its shaft. Below it is a jack shaft 11 upon which is rotatable a step belt pulley 12, comprising pulley steps 13, 14, 15, and 16 of decreasing diameter.

A main motor belt 17 connects the motor pulley 10 and the largest step pulley 13 to drive the step pulley 12 as a whole.

The next smaller pulley step 14 is connected by a pump belt 18 to the belt pulley 19 of an oil pump 20 to drive it.

The next two smaller pulley steps 15 and 16 are to be connected, one or the other optionally, by a spindle drive belt 21, to one or the other of pulleys 22—23, on a machine main spindle 24, to be described, to drive it at a corresponding selected speed.

To support the motor 9, a long horizontal pin 25 is extended through the flanges of the frame channel 7; and a channel form motor base 26 on which the motor is mounted is hingingly mounted on the pin 25.

To support the jack shaft 11, a channel form carrier 27 has its channel flanges hingingly mounted on the pin 25 and carries a channel form hanger 28, in the channel flanges of which the jack shaft is mounted.

By this means, the motor 9 and the jack shaft 11 can each be hingingly adjusted around the pin 25 for belt tightening purposes; and any suitable means for so rocking them and fixing them when adjustably rocked, may be provided; and such means not constituting an essential part of the present invention has not been further illustrated.

Figures 3, 8A, 9:
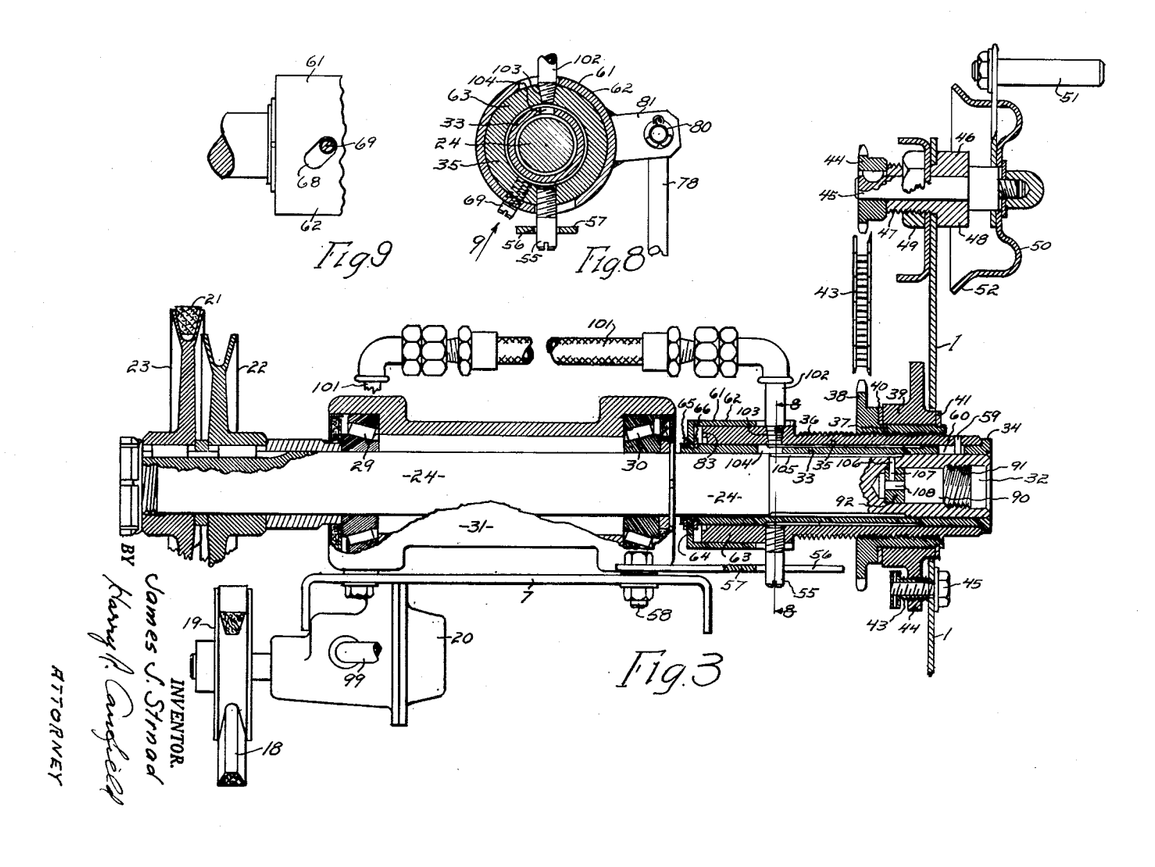
Fig. 3 is a longitudinal sectional view to enlarged scale of a part of Figs. 1 and 2, the view being referred to the plane 3—3 of Fig. 2.
Fig. 9 is a fragmentary view taken from the direction of the arrow 9 of Fig. 8.

Referring to Fig. 3, the main spindle 24 is supported at an intermediate portion in tapered roller bearings 29 and 30 mounted in a bearing housing 31 supported on the frame channel 7; and is driven by one or the other of the belt pulleys 22 or 23 as referred to; and in Fig. 3 also the pump 20 is shown as mounted on the same frame channel 7.

At its forward tool supporting end the spindle 24 projects forwardly through an opening in the front wall; and at its end is bored out along its axis as at 32 to receive, and have mounted therein, the tool to be driven, and this will be more fully described later in connection with Figs. 4 and 5.

Telescoped over the forward end of the spindle 24 and slidably fitting on it, is an inner sleeve 33, the outer end of which has a flange 34.

Telescoped over the inner sleeve and slidably fitting on it, is an outer sleeve 35.

The flange 34 of the inner sleeve overlaps a part of the end of the outer sleeve 35.

The outer sleeve 35 is exteriorly threaded as at 36, and meshed on the threads in the nature of a nut, is the hub 37 of a lower chain sprocket wheel 38; the hub being rotatable in a bearing ring 39 secured to the frame wall 1.

The sprocket wheel 38 abuts upon a thrust washer 40 on one face of the bearing ring 39; a spring retainer washer or ring 41 on the hub 37 abuts upon the opposite face of the bearing ring; whereby the hub 37 is retained axially in the bearing ring, 39.

The bearing ring 39 is secured to the frame wall 1 by a plurality of devices (one being shown) comprising tubular screws 43 threaded into a flange 44 on the bearing ring 39 and adjustable therein, and headed screws 45 passing through the wall 1 and threaded into the tubular screws 43, whereby the bearing ring 39 may be adjustably positioned to adjust the threaded engagement of the sprocket wheel 38 or its hub 37 with the outer sleeve 35 to avoid undue cramping or friction on the threads.

By this means when the sprocket wheel 38 is rotated it itself is restrained against axial movement and propels the outer sleeve 35 axially.

To rotate the sprocket wheel 38 for this purpose, it is connected by a sprocket chain 43 to an upper and preferably smaller sprocket wheel 44 mounted on a shaft 45 which is rotatable in a bearing 46. The bearing 46 has a shank 47 projected through a hole in the frame wall 1, and by means of a head 48 of the bearing element on the front side of the wall and a clamp nut 49 on the shank is clamped upon the wall 1.

Mounted on the end of the shaft 45 opposite the sprocket wheel 44 is a pressed sheet metal dial 50, and a handle 51 is provided for turning the dial and the sprocket wheel 44.

The dial 50 has a circular conical skirt 52 on which is provided a scale 53, see Fig. 2, and a scale pointer 54 on the front wall 1 indicates rotated positions of the dial; and in view of the foregoing, it will be understood that the indicated positions of the dial indicate the axially propelled position of the outer sleeve 35.

The outer sleeve 35 while being movable axially to position it, as referred to, is prevented from rotating by a pin 55 extending radially outwardly therefrom and projecting into a rectilinear slot 56 provided in one end of an elongated finger 57 which is mounted upon the frame channel 7 by a bolt 58 at the other end, whereby the finger may be swung on the bolt to dispose the slot parallel to the axis of the outer sleeve 35.

The inner sleeve 33 has reciprocatory movement axially, relative to the outer sleeve 35; and its rearward movement is stopped by the flange 34 abutting upon the forward end of the outer sleeve 35; and its forward movement is limited and stopped by means to be described; and the inner sleeve 33 is prevented from rotating in the outer sleeve 35, by a pin 59 on the outer sleeve, extending radially inwardly into a rectilinear axially extending slot 60 in the inner sleeve 33. The reciprocatory axial movement of the inner sleeve 33 is provided for as follows.

A cup form cam element 61 has a side wall or skirt 62, cylindrical interiorly, telescoped over an unthreaded cylindrical rear end portion 63 of the outer sleeve 35 and slidingly fits thereon; whereby it has rotary and axial bearing on the outer sleeve 35.

The inner end of the inner sleeve 33 passes through a hole in the cup bottom 64 of the cup form cam element 61, whereby the cam element 61 may rotate relative to the inner sleeve 33; and the cam element 61 and inner sleeve 33 are constrained to move axially in unison by retaining rings 65 and 66 on the sleeve engaging opposite sides of the cup bottom 64.

The cup skirt 62 has a helical or spiral cam slot 68 therethrough; and a pin 69 on the outer sleeve 35 extends radially therefrom and into the cam slot 68.

By this construction, when the skirt 62 of the cam element 61 is rotated on the outer sleeve 35 (by means to be described) the cam slot 68 rotates with it, and by the sliding engagement of the cam slot with the pin 69, the cup form cam element 61 is given an axial movement concurrently with its rotary movement; and its axial movement is communicated to the inner sleeve 33, and moves it axially relative to the main spindle 24 and relative to the outer sleeve 35; and by rotary movement of the cam element 61 in alternate directions the inner sleeve 33 may be reciprocated.

To rotate or oscillate the cam element 61 as described the following means is provided.

In the lower part of the machine, Figs. 1 and 2, a horizontal tubular bearing 10, Fig. 6, is mounted, as by welding, on the frame channel 6 and has a rock shaft 71 extending therethrough; and on one end of the rock shaft is mounted a long outer arm 72 and on the other end a short inner arm 73, both extending forwardly therefrom.

The long arm 72 has a chain 74 connected to its end and depending therefrom, and connected at its lower end to a pedal 75 hinged at 76 to a pedal base 77 that rests upon the floor below the machine.

A generally vertical rod-like link 78 is hooked at its lower end into a perforation 79 in the end of the short arm 73; and at its upper end is hooked into a perforation 80 in an arm 81 extending laterally from the aforesaid cup-form cam element 61.

A generally vertical tensioned coil spring 82 is connected at its lower end to the short arm 73, extends upwardly therefrom and at its upper end is connected to the frame channel 7, and yieldably holds both arms 72 and 73 in an upper position.

Upward thrust on the link rod 78 thus effected by the spring 82 rotates the cup-form cam element 61 counter-clockwise as viewed from the free forward end of the spindle 24 or as in Fig. 8; and the cam slot 68 has such angular direction that its cam action retracts the inner sleeve 33, and brings the forward end flange 34 of the inner sleeve 33 into engagement with the forward end of the outer sleeve 35, as a normal position of the parts; and the arm 81 on the cup-form cam element 61 is disposed so that at this time it extends laterally therefrom substantially generally at right angles thereto, Fig. 8.

As will now be apparent, upon depressing the pedal 75, the long arm 72 will be rocked downwardly by the chain 74, and the short arm 73 will be rocked downwardly, and pull on the link rod 78 and cause it to rotate the cam element 61 in the clockwise direction and propel the inner sleeve 33 forwardly; and that upon releasing the pedal 75 the spring 82 will be effective to propel the inner sleeve 33 rearwardly to its said normal position.

Upon forward movement of the inner sleeve 33 as described, the cup bottom 64 comes into engagement with the inner or rearward end 83 of the outer sleeve 35 and is stopped thereby.

Thus the inner sleeve 33 has reciprocatory motion and is stopped in both directions by the ends of the outer sleeve 35.

A third arm 84 is connected to the short arm 73 and rocks with it and extends rearwardly from the rock shaft 71. Under the end of the third arm 84 is a motor switch 85 of the so-called micro-type, that opens and closes the circuit of the motor 9 by very small movement of the arm. The housing only of this switch is shown, the switch parts therewithin as well as the motor circuit being omitted to simplify the disclosure, these parts, however, being well known and understood in the art; but it is added here that the switch is arranged to be normally in the open condition when the third arm 84 is in a lower rocked normal position effected by the said coil spring 82 as will be understood.

The perforation 79 in the end of the said short arm 73, see Fig. 7, is vertically elongated to provide lost motion, whereby when the pedal 75 is depressed, its movement first raises the third arm 84 to operate the switch 85 to close the motor circuit and start the motor; and continued downward movement of the pedal subsequently takes up the said lost motion and pulls on the link rod 78 to operate the cam mechanism as described; whereby it is insured that the main spindle 24 will be rotating before the inner sleeve 33 is moved forwardly.

Under the pedal 75 and mounted on the pedal base 77 is a stop device comprising a stop post 86 having a headed screw 87 therein, the screw constituting an extension of the post by which its length can be adjusted. The post is hinged to the pedal base at 88 whereby the post may be rocked upward and positioned by engaging a stop 89 on the base, to be engaged by the pedal 75 when depressed, or, optionally, may be rocked to a horizontal position out of the path of the pedal. Its length is adjusted by the screw 87 so that it will stop the pedal 75 when depressed just far enough to start the motor, and prevent further depression of the pedal to move the inner sleeve 33 by the cam mechanism as described.

The construction of the machine spindle 24 is coordinated with the tool to be driven, and in Figs. 4 and 5, a tool is shown mounted on the spindle 24, and as having a generalized construction exemplifying either a hone tool or a reamer tool, as hereinbefore referred to.

The machine spindle 24, Fig. 3, is bored out as at 90 and threaded as at 91. Upon the bottom of the bore is a thick thrust washer or disc 92.

The tool, Figs. 3 and 4, has a spindle head 93 formed to fit the spindle bore 90 and threaded to be screwed into it, and has a hexagon collar 94 for turning it with a wrench; and it is screwed into the machine spindle bore 90 until the end of the tool spindle head 93 comes tight on the disc 92; clearance preferably being left between the hexagon collar 94 and the end of the machine spindle 24 to insure pressure engagement with the disc.

The tool has a collar 95, which as in representative hone tools and reamer tools hereinbefore referred to, may comprise a thrust ball bearing.

In the operation of the machine as thus far described, and when the tool to be driven is an expansible hone tool, mounted on the spindle as described, and as shown in Figs. 4 and 5, the inner sleeve 33 will normally be in the position illustrated with its flange 34 engaging the forward end of the outer sleeve 35. The working diameter of the tool will be at the minimum, effected by its own structural spring, and the collar 95 of the tool, will be held by the tool spring in engagement with the hexagon collar 94 as in Fig. 4.

The hole in the work to be honed is manually telescoped over the hone tool by the operator and then the pedal 75 is depressed by the operator.

The pedal movement is communicated by the chain 74 to the long arm 72, and thence to the short arm 73 and third arm 84.

Movement of the pedal 75 initially rocks the third arm 84 to operate the microswitch 85 to close the motor circuit and start the motor 9; and the motor by the belt and pulley transmission as described drives the machine spindle 24, and the tool.

Upon continued depressing of the pedal 75 (the stop post 86 under the pedal having been hinged out of the way) the lost motion in the elongated perforation 79 in the short arm 73 is taken up and the short arm moves the link rod 78 downwardly, and the link rod rotates the cup form cam element 61 which by means of its helical skirt slot 68 acting on the stationary pin 69 propels the inner sleeve 33 forwardly, engaging its end with the collar 95 on the tool and moving the collar axially on the tool and thereby expanding the working diameter of the tool by means of its own mechanism.

Axial movement of the inner sleeve 33 goes on through its whole stroke at the end of which the cam cup bottom 64 is stopped on the inner end of the outer sleeve 35.

Fig. 4 illustrates the parts at the start of the stroke of the sleeve 33 and Fig. 5 illustrates the parts after some movement of the sleeve 33 has taken place.

In practice, it is intended that the inner sleeve 33 will have expanded the tool to a preselected maximum working diameter when it reaches the end of its stroke.

This maximum tool diameter is determined by the position of the forward end of the inner sleeve 33 relative to the tool when the sleeve reaches the end of its stroke, and is adjustable, by adjusting the axial position of the outer sleeve 35 which adjusts the axial position from which the inner sleeve 33 starts to move.

This is done by rotating the lower sprocket wheel 38 to propel the outer sleeve 35 in one direction or the other to the required position; and this is done by rotating the dial 50 and the upper sprocket wheel 44.

The scale 53 on the dial 50 can be calibrated to indicate the maximum diameter to which the hone will be expanded, or, can be merely an indicating gage by which the maximum diameter of the hone can be changed by very small increments in say tens of thousandths of an inch, until the given hone is finishing the hole to the desired diameter.

When the pedal 75 is released, the spring 82 raises the short arm 73 and rotates the cam element 61 in the other direction to retract the inner sleeve 33 to its normal position to allow the hone mechanism to contract its working diameter, for removal of the finished work therefrom.

When the tool to be driven is a reamer tool such as that referred to, the inner sleeve 33 remains at all times in its said normal position with its flange 34 stopped on the end of the outer sleeve 35. By rotating the dial 50, the outer sleeve 35 and inner sleeve 33 and cam element 61 are all moved axially in unison; and the inner sleeve 33 moves the collar 95 on the tool against the force of the tool spring which tends to expand the tool; and thereby the tool is contracted, to a diameter at which the hole in the work can be telescoped over it, and cutting by the tool started.

Then from time to time the dial 50 is turned by measured increments as indicated on the dial, to retract the sleeves 33 and 35 in unison, allowing the tool spring to expand the tool, the increments of expansion and the final diameter of the tool, being indicated on the dial scale.

The pedal 75 in this case is depressed only far enough to start rotation of the spindle 24, further movement of the pedal which might move the inner sleeve 33 relative to the outer sleeve 35 being prevented by the stop post 86 which has been hinged around to the position in which the pedal is stopped on it.

When wet abrading by hone tools, or wet cutting by reamer tools is wanted, oil of suitable or known composition and fluidity is supplied to the aforesaid ducts in the tool spindle by the following means, the primary tool duct being illustrated in Fig. 4 at 96.

A pan 97 is provided, connected to the main frame front wall 1, disposed to be under the working tool which serves as a reservoir from which oil is supplied to the tool and to which oil returns after flowing through the tool and over its working surfaces.

The oil is drawn from the reservoir 97 by the aforesaid pump 20 through a pipe 99, having a hand valve 100 in the line thereof to regulate the rate of flow. From the pump, the oil flows by a pipe 101 to a nipple 102 threaded into a pipe thread hole 103 going radially through the wall of the outer sleeve.

A hole or slot 104 is provided in the inner sleeve 33 aligned with the nipple hole 103 and long enough axially so as not to throttle the nipple hole during reciprocatory movement of the inner sleeve.

The hole 104 communicates at all times with a tubular passageway 105 between the inner sleeve 33 and the outer surface of the main spindle 24 and this is conveniently provided by turning down a portion of the spindle to a smaller diameter.

A radial duct 106 is provided in the spindle 24 leading from the tubular passageway 105 and aligned with a duct 107 in the thick disc 92 which latter opens into an axial hole 108 through the disc, aligned with the aforesaid axial duct 96 in the tool spindle. It has already been explained that the outer sleeve 35 and inner sleeve 33 do not rotate, so that the foregoing means including the tubular passageway 105 provides for supplying oil under pump pressure to the driven tool during rotation of the main spindle 24 and the tool.

In view of the present day practice, with hone tools and reamer tools of the types referred to hereinbefore, I have found that a rotary speed for the main spindle 24 of 50 R. P. M. to 350 R. P. M. will be satisfactory taking into account the diameter of the bore to be finished and the type of material of the work and the quality of finish desired.

Also, I have found that the diameter of such tools can be changed as described, with satisfactory operation of the machine and tool if the ratio of the sprocket wheels 38 and 44 and the pitch of the thread 36 on the outer sleeve 35 be predetermined so that one revolution of the dial 50 will produce an axial movement of the outer sleeve 35 of approximately .019".

In the foregoing, the machine has been described for driving both hone tools and reamer tools of identified types, respectively; and to this end, as described, when hone tools are used, the operator may first reciprocate the outer and inner sleeves 35 and 33 in unison to position the inner sleeve 33 to adjust its position axially, by the micrometer mechanism comprising the dial 50; and then may reciprocate the inner sleeve 33 alone between stops by other means, for example, a pedal 75 to cause the inner sleeve 33 to expand and contract the tool.

When a reamer tool is used, the operator may first reciprocate the inner and outer sleeves in unison, by the micrometer dial mechanism to position the inner sleeve, and then, by the same micrometer mechanism, reciprocate them in unison to cause the inner sleeve to expand and contract the tool. In both cases, the inner sleeve 33 is adjustably positioned axially through the intermediate agency of the outer sleeve 35 and its thread 36 and rotary nut or sprocket wheel 38.

When the machine is to be used with reamer tools only, the outer sleeve 35 may, if preferred, for simplification, be omitted, and as a modification this is shown fragmentarily in Fig. 10.

Here the inner sleeve 33A has a thread 36A formed directly thereon and a nut-like sprocket wheel 38A meshed with the thread, the operation to reciprocate the sleeve 33A by the dial operated mechanism being the same as in the first form.

The oil pipe nipple 102 is here screwed into a threaded hole 103A in the sleeve 33A in communication with the tubular passageway 105 in the spindle.

The sleeve 33A may be prevented from rotating by a pin 55A sliding in the slot 56 of the finger 57 as in the main form.

While it has not been mentioned, it will be obvious that the oil pipe 101 leading to the spindle will preferably be flexible to allow for reciprocatory movement of the nipple 102, in both the main form and the modification.

In the foregoing, it is contemplated that the pedal 75 will at times be used only to start and stop the motor. At such times, if preferred, the pedal may be discarded and the motor may be started by a hand switch 109 in the motor circuit, mounted on the front wall 1.

In the foregoing, the reamer tool, to drive which the machine embodying the invention is particularly adapted, is referred to as of a type comprising mechanism for expanding it. It is to be understood, however, that the machine may be used with other types of reamer tools.

Also, the abrading tools referred to are described as of the type called hones; but it is to be understood that abrading tools of the type called laps or lapping tools may also be used with the machine.

Changes and modifications may be made in the described embodiment of the invention, such as will occur to those skilled in the art, and the invention comprehends all such changes and modifications that come within the scope of the appended claims.

I claim:

1. A machine for driving a rotary tool that has a mechanism actuable to expand and contract its working diameter; the machine comprising a main frame rotatably supporting a power driven spindle having a free forward end, and constructed to have a rotary tool mounted thereon at the free end coaxially therewith; a sleeve surrounding a forward portion of the spindle and movable axially relatively thereto, the forward end of the sleeve engageable with the tool mechanism to actuate it by axial movement of the sleeve; means preventing rotation of the sleeve during rotation of the spindle; a threaded nut element surrounding the sleeve, and bearing means rotatably supporting it on the frame; screw threaded means meshed with the nut element and associated with the sleeve in a manner to move the sleeve axially of the spindle upon rotation of the nut element; operator-operable rotary means arranged to rotate the nut element to axially move the sleeve with micrometer increments of movement; and rotary dial scale means connected to rotate synchronously with the nut element and indicating increments of movement of the sleeve.

2. A machine for driving a rotary tool that has a spring pressed mechanism for expanding its working diameter; the machine comprising a main frame rotatably supporting a power driven spindle constructed to have the tool mounted on a forward portion thereof coaxially therewith; an inner sleeve surrounding a forward portion of the spindle and movable axially relative thereto; an outer sleeve surrounding the inner sleeve; a screw thread on the outer sleeve; a threaded nut element surrounding the outer sleeve meshed with its thread, and bearing means rotatably supporting the nut element on the frame; operator-operable means arranged to rotate the nut element in alternate directions to axially reciprocate the outer sleeve with micrometer increments of movement; mutually engaging abutment means on the outer and inner sleeves to cause the inner sleeve to move forwardly with the outer sleeve upon forward movement of the outer sleeve, to cause the inner sleeve to actuate the tool mechanism in opposition to its spring; the inner sleeve being propellable rearwardly by the tool spring upon rearward movement of the outer sleeve; rotary dial scale means connected to rotate synchronously with the nut element and indicating micrometer increments of forward and rearward movement of the inner sleeve; and means preventing rotation of the sleeves, during rotation of the spindle.

3. A machine for driving a rotary tool of the type having a mechanism comprising a spring tending to expand the tool, and actuable by compression of the spring to contract the tool; the machine comprising a rotatably supported power driven spindle supporting the tool at a forward end thereof to drive the tool; an outer and an inner sleeve surrounding and coaxial with the spindle and reciprocable axially relative to the spindle; a reversible, rotary, operator-operable mechanism arranged to axially reciprocate the outer sleeve with micrometer increments of movement; abutments on the respective sleeves mutually engageable to cause the inner sleeve to be moved forwardly by forward movement of the outer sleeve, upon rotation of the operable mechanism in one direction to cause the inner sleeve to actuate the tool mechanism and compress the tool spring; the inner sleeve being movable rearwardly by reaction force of the compressed tool spring and maintaining said abutments engaged, upon rotation in the other direction; and rotary dial scale means rotatable synchronously with the operable mechanism and indicating micrometer increments of movement of the inner sleeve.

4. A machine for driving a rotary tool that has a mechanism actuable to expand and contract its diameter, the machine comprising a main frame rotatably supporting a power driven cylindrical spindle constructed to have a tool mounted on a forward portion thereof; an elongated sleeve having a smooth cylindrical bore therein and telescoped over the spindle and thereby rendered slidingly reciprocable axially on the spindle, and means holding it against rotation on the spindle, and constructed to actuate the tool mechanism by its reciprocations; a first operator-operable means arranged to move the sleeve in the forward reciprocatory direction with micrometer increments of movement to dispose it in a selected axial position and comprising stop means preventing rearward movement from said selected position; and a second operator-operable means arranged to reciprocate the sleeve forwardly from and back to its selected position independently of said first operator-operable means; and stop means stopping said forward movement of the sleeve by the second operator-operable means.

5. A machine for driving a rotary tool that has a mechanism actuable to expand and contract its diameter; the machine comprising a main frame rotatably supporting a power driven cylindrical spindle, constructed to have a tool mounted coaxially thereon on a forward portion thereof; an elongated sleeve having a smooth cylindrical bore therein and telescoped over the spindle and thereby rendered slidingly reciprocable axially on the spindle and means holding it against rotation on the spindle, and constructed to actuate the tool mechanism by its reciprocations; a first operator-operable means arranged to move the sleeve with micrometer increments of movement to dispose it in a selected axial position, and a second operator-operable means arranged to reciprocate the sleeve away from said selected position to a second position, and back to the selected position, independently of said first operator-operable means; and stop means stopping reciprocation by the second operator operable means at said selected and second positions.

6. A machine for driving a rotary tool that has a mechanism actuable to expand and contract its diameter; the machine comprising a main frame rotatably supporting a power driven spindle, constructed to have a tool mounted coaxially on a forward portion thereof; a sleeve surrounding the spindle, and movable axially thereof to actuate the tool mechanism; a threaded nut element surrounding the sleeve; a threaded element meshed with the nut element and associated with the sleeve in a manner to cause it to move the sleeve axially with micrometer increments of movement upon rotation of the nut element to dispose the sleeve in a selected axial position; a first operator-operable means arranged to rotate the nut element; a second operator-operable means arranged to reciprocate the sleeve forwardly from and back to its selected position, independently of the first operator-operable means.

7. A machine for driving a rotary tool that has a mechanism actuable to expand and contract its diameter; the machine comprising a main frame rotatably supporting a power driven spindle, constructed to have a tool mounted coaxially on a forward portion thereof; a sleeve surrounding the spindle, and reciprocable axially thereof to actuate the tool mechanism; a threaded nut element surrounding the sleeve; a threaded element meshed with the nut element and associated with the sleeve in a manner to cause it to move the sleeve axially forwardly with micrometer increments of movement upon rotation of the nut element to dispose the sleeve in a selected forward position; abutment means engaging the sleeve in said selected position and preventing rearward movement therefrom; spring means tending to hold the sleeve engaged with said abutment means; a second operator operable means arranged to move the sleeve axially forwardly from said abutment engagement against the force of said spring means to a second position; and alternatively to allow the spring means to return the sleeve to said abutment engagement and to said selected position; and a second abutment means stopping movement of the sleeve in said second position.

8. A machine for driving a rotary tool that has a mechanism actuable to expand and contract the tool diameter; the machine comprising a main frame rotatably supporting a power driven spindle, constructed to have a tool mounted on a forward portion thereof; an elongated tool actuating element the actuating element supported by bearing means for sliding reciprocatory movement parallel to the spindle axis, and means preventing rotation of the actuating element around the spindle axis; a first operator operable means arranged to move the actuating element axially with micrometer increments of movement to dispose it in a selected axial position; a second operator operable means arranged to reciprocate the actuating element axially back and forth between the selected position and a second position, and abutment means stopping said reciprocatory axial movement of the actuating element at the second position and selected position.

9. A machine for driving a rotary tool that has a mechanism actuable to expand and contract its diameter; the machine comprising: a main frame rotatably supporting a power driven spindle, constructed to have a tool mounted on a forward portion thereof; an elongated tool actuating element the actuating element supported by bearing means for sliding reciprocatory movement parallel to the spindle axis, and means preventing rotation of the actuating element around the spindle axis; operator operable mechanism arranged to reciprocate the actuating element axially; axially spaced apart abutment means to stop reciprocatory movement of the actuating element in each direction of reciprocation; and a second operator operable means arranged to adjustably position the abutment means axially, with micrometer increments of movement.

10. A machine for driving a rotary tool that has a mechanism actuable to expand and contract its diameter; the machine comprising: a main frame rotatably supporting a power driven spindle, constructed to have a tool mounted thereon; an elongated tool mechanism actuating element the actuating element supported by bearing means for sliding reciprocatory movement parallel to the spindle axis, and means preventing rotation of the actuating element around the spindle axis; operator operable mechanism arranged to reciprocate the actuating element axially; abutment means to stop movement of the actuating element in each direction of reciprocation; said abutment means comprising axially spaced abutments provided on the actuating element, engageable with axially spaced abutments on an axially positionable element; and a second operator operable means arranged to axially position the axially positionable element with micrometer increments of axial movement.

11. A machine for driving a rotary tool that has a mechanism comprising a movable element and actuable to expand and contract its diameter upon alternate movements of the movable element; the machine comprising: a main frame rotatably supporting a power driven spindle, constructed to have a tool mounted thereon; an elongated tool mechanism actuating element; the actuating element supported by bearing means for sliding reciprocatory movement parallel to the spindle axis, and means preventing rotation of the actuating element around the spindle axis; mechanism for reciprocating the actuating element axially comprising operator-operable means arranged to move the actuating element axially in one direction to effect expansion of the tool by correspondingly moving the said movable element; and spring means tensioned by said movement, reacting on the actuating element to move it axially in the return direction; stop means disposed in the path of movement of the actuating element to stop movement of the actuating element in said one direction; and positionally adjustable stop means disposed in the path of movement of the actuating element to stop its movement in the return direction.

12. A machine for driving a rotary tool that has a mechanism actuable to expand and contract its diameter; the machine comprising: a main frame rotatably supporting a power driven spindle, constructed to have a tool mounted thereon; a tool mechanism actuating inner sleeve surrounding the spindle and axially reciprocable thereon; an outer sleeve surrounding the inner sleeve, supported on the frame, and having axially spaced abutment means thereon; operator operable mechanism arranged to reciprocate the inner sleeve axially to expand and contract the tool; and axially spaced abutment means on the inner sleeve engaging the abutment means of the outer sleeve and stopping its axial movement in each direction of reciprocation.

13. A machine for driving a rotary tool that has a mechanism actuable to expand and contract its diameter; the machine comprising: a main frame rotatably supporting a power driven spindle, constructed to have a tool mounted thereon; a tool mechanism actuating inner sleeve surrounding the spindle and axially movable thereon; an outer sleeve surrounding the inner sleeve, supported on the frame, and having axially spaced abutment means thereon; operator operable mechanism arranged to reciprocate the inner sleeve axially; and axially spaced abutment means on the inner sleeve engaging the abutment means of the outer sleeve and stopping its axial movement in each direction of reciprocation; and a second operator operable means arranged to adjust the axial position of the outer sleeve and its abutment means with micrometer increments of movement.

14. A machine for rotatably driving a tool that has an actuable mechanism, the machine comprising: a main frame supporting an electric motor and rotatably supporting a spindle always connected to the motor to be driven thereby, and constructed for mounting a tool thereon; a movable tool mechanism actuating element; the machine comprising mechanism operable to move the actuating element; a motor controlling switch for starting and stopping the motor; a pedal depressible by an operator; a lever adapted to transmit pedal movement to the switch and to the machine mechanism, to operate the switch to start the motor upon initially depressing the pedal and to operate the machine mechanism upon further depression of the pedal.

15. The machine described in claim 14 and in which the pedal has a stop associated therewith, and the stop is movable to a position out of the path of the pedal when depressed, and movable to a position to positively stop pedal depression movement when the pedal has been depressed far enough to start the motor.

16. In a machine for rotatably driving a tool; a main frame rotatably supporting a power driven spindle provided with a recess in its end for receiving a mounting portion of a tool to be driven that comprises an actuatable tool mechanism; an outer sleeve surrounding the spindle and positionably movable axially thereof; means to actuate the tool mechanism comprising an inner sleeve within the outer sleeve axially reciprocable on the spindle and within the outer sleeve and arranged to actuate the tool mechanism by its reciprocations; operator operable means arranged to reciprocate the outer sleeve by micrometer increments of movement to position it, and to reciprocate the inner sleeve; the inner sleeve being stopped and positioned in at least one direction by mutually engageable abutment means on the two sleeves; an oil supply system comprising a pump arranged to supply oil to a flexible oil pipe connected to the outer sleeve and sealedly communicating through the wall of the outer sleeve with an opening through the wall of the inner sleeve; the opening through the inner sleeve wall communicating with an axially elongated annular groove in the outer surface of the spindle; duct means leading from the annular groove to an inner portion of the tool receiving recess.

17. A machine for rotatably driving tools comprising an actuable mechanism to change the tool diameter; the machine comprising a main frame; a power driven spindle rotatably supported on the frame; and constructed to mount a tool thereon coaxially therewith; an inner sleeve surrounding the spindle, and axially movable thereon for actuating the tool mechanism; an outer sleeve surrounding the inner sleeve and the inner sleeve axially movable therein; a screw threaded on the outer sleeve; a nut element on the thread in the form of a wheel and bearing means on the frame supporting it for rotary non-axial movement; a second wheel rotatably supported on the frame, the two wheels connected by a transmission; manual means arranged to rotate the second wheel to correspondingly turn the first wheel to axially propel the outer sleeve with micrometer increments of axial movement; abutment means on the inner sleeve engageable by abutment means on the outer sleeve, spring means arranged to react on the inner sleeve to hold the abutment means in mutual engagement to cause said axial propulsion of the outer sleeve to axially propel the inner sleeve.

18. A machine for rotatably driving tools comprising an actuable mechanism to change the tool diameter; the machine comprising a main frame; a power driven spindle rotatably supported on the frame; and constructed to mount a tool thereon coaxially therewith; an inner sleeve surrounding the spindle, and axially movable thereon for actuating the tool mechanism; an outer sleeve surrounding the inner sleeve and the inner sleeve axially movable therein; a screw thread on the outer sleeve; a nut element on the thread in the form of a wheel and bearing means on the frame supporting it for rotary non-axial movement; a second wheel rotatably supported on the frame, the two wheels connected by a transmission; manual means arranged to rotate the second wheel to correspondingly turn the first wheel to axially propel the outer sleeve with micrometer increments of axial movement; a mutually engaged cam and cam follower elements one supported for rotation with respect to the sleeves, and the other movable axially in unison with the inner sleeve, to reciprocate the inner sleeve axially with respect to the outer sleeve upon rotation of the said rotatable cam element in alternate directions; operator operable means to rotate the rotatable one of the cam elements, in one direction, comprising an operator's depressible pedal connected to the rotatable cam element, and spring means arranged to react upon the rotatable cam element and pedal, to rotate the cam element in the other direction, and return the depressed pedal; and abutments on the sleeves mutually engageable upon reciprocation of the inner sleeve in either direction.

19. A machine for driving a rotary tool that has a mechanism actuable to expand and contract the tool diameter; the machine comprising a main frame rotatably supporting a power driven spindle, constructed to have a tool mounted thereon; an elongated tool mechanism actuating element; the actuating element supported by bearing means for sliding reciprocatory movement parallel to the spindle axis, and means preventing rotation of the actuating element around the spindle axis; operator-operable means arranged to move the actuating element axially with micrometer increments of movement in either direction of reciprocation to determine a normal position therefor; and other operator-operable means arranged to reciprocate the actuating element axially away from and back to said normal position in a range of movement, and axially spaced stop means prescribing the range of movement.

20. A machine for rotatably driving tools comprising an actuable mechanism to change the tool diameter; the machine comprising a main frame; a power driven spindle rotatably supported on the frame; and constructed to mount a tool thereon coaxially therewith; an inner sleeve surrounding the spindle, and axially movable thereon for actuating the tool mechanism; an outer sleeve surrounding the inner sleeve and the inner sleeve axially movable therein; a screw thread on the outer sleeve; a nut element on the thread in the form of a wheel and bearing means on the frame supporting it for rotary non-axial movement; a second wheel rotatably supported on the frame, the two wheels connected by a transmission; manual means arranged to rotate the second wheel to correspondingly turn the first wheel to axially propel the outer sleeve with micrometer increments of axial movement; a cam element having a tubular portion rotatable on the outer sleeve; a cam slot in the tubular portion; a cam follower on the outer sleeve engaged in the cam slot, a bearing connection between the cam element and the inner sleeve providing for axial movement of the cam element and inner sleeve in unison, and rotary movement of the cam element relative to the inner sleeve, whereby the inner sleeve may be reciprocated axially in the outer sleeve upon rotation of the cam element in alternate directions; a spring tending to rotate the cam element in one direction; operator operable means to rotate the cam element in the other direction, comprising an operator's depressible pedal, an arm on the cam element and a link connecting the pedal and the arm; a projection on the outer sleeve engaged in an axially extending slot on a stationary portion of the main frame to prevent rotation of the outer sleeve; and guide means preventing rotation of the inner sleeve.

References Cited in the file of this patent

UNITED STATES PATENTS

| Number | Name | Date |
|---|---|---|
| 468,682 | McLaughlin | Feb. 9, 1892 |
| 520,142 | Goddard | May 22, 1894 |
| 759,166 | Eames | May 3, 1904 |
| 1,100,048 | Beck | June 16, 1914 |
| 1,423,090 | Delano | July 18, 1922 |
| 1,530,293 | Breitenstein | Mar. 17, 1925 |
| 1,876,468 | Quigley | Sept. 6, 1932 |
| 1,978,712 | Kern | Oct. 30, 1934 |
| 2,000,330 | High | May 7, 1935 |
| 2,238,326 | Indge | Apr. 15, 1941 |
| 2,286,360 | Gjertsen | June 16, 1942 |
| 2,301,111 | Cuppers | Nov. 3, 1942 |
| 2,349,526 | Sunnen | May 23, 1944 |
| 2,354,347 | Peets | July 25, 1944 |
| 2,483,590 | Mitchell | Oct. 4, 1949 |